July 2, 1929.  A. VAN DUYN  1,719,457

WEIGHING APPARATUS

Filed Sept. 6, 1927

Inventor
Adrianus van Duyn
By Nissen & Crane
Attys.

Patented July 2, 1929.

1,719,457

UNITED STATES PATENT OFFICE.

ADRIANUS van DUYN, OF ROTTERDAM, NETHERLANDS, ASSIGNOR TO NAAMLOOZE VENNOOTSCHAP MAATSCHAPPIJ TOT VERVAARDIGING VAN SNIJMACHINES VOLGENS VAN BERKEL'S PATENT EN VAN ANDERE WERKTUIGEN, OF ROTTERDAM, NETHERLANDS, A LIMITED LIABILITY COMPANY OF THE NETHERLANDS.

WEIGHING APPARATUS.

Application filed September 6, 1927, Serial No. 217,566, and in Great Britain October 25, 1926.

It is well known that in certain types of weighing apparatus particularly those having indicating mechanism with a pendulum resistant, if the apparatus is unlevel or even slightly varied from an accurately weighing horizontal position, the indicating mechanism does not give a true indication of the weight of the load being weighed in that when there is no load on the weighing mechanism the pointer of the indicating mechanism does not indicate zero. Moreover, if this defect is rectified by the addition of weight to some part of the weighing mechanism so as to register the pointer with the zero graduation, the apparatus does not weigh correctly and, for instance, on putting a load of two pounds on the load platform of the apparatus, the pointer does not indicate two pounds. Consequently it is possible with such weighing apparatus to defraud without this being apparent.

The primary object of my invention is to overcome this defect and thereby make it impossible to defraud in this manner.

Another object of the invention is to provide a level indicator which will accurately indicate the correct horizontal weighing position that the apparatus must assume before the weighing mechanism thereof is permitted to function.

A still further object is to provide means on the weighing apparatus for adjusting its level to an accurately weighing horizontal position, using the indicator above referred to as a gauge.

With these and other objects in view, the description will now proceed with reference to the accompanying drawing in which a practical embodiment of my invention is illustrated.

In said drawing:—

Figure 1:
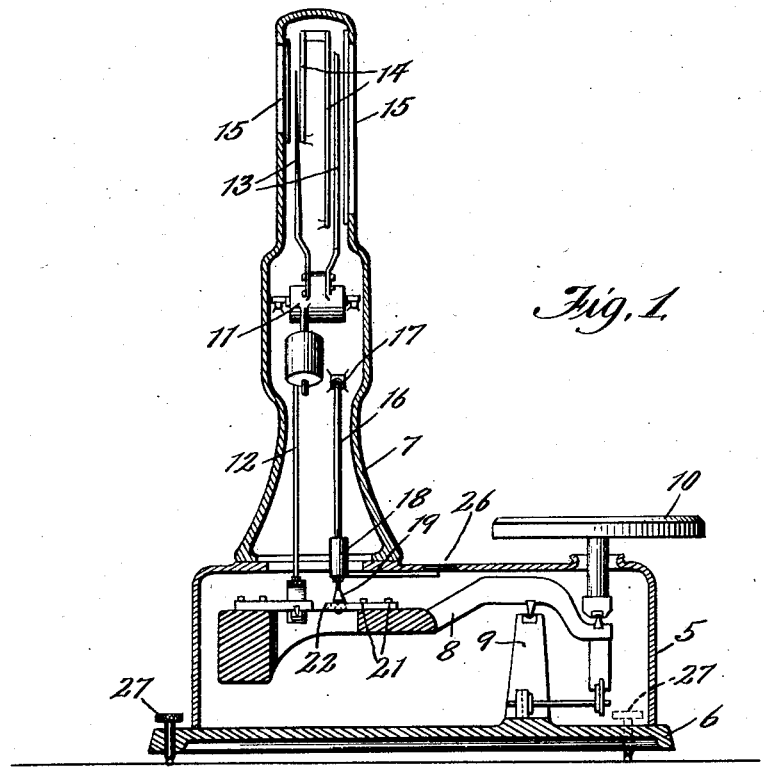
Figures 2, 3:
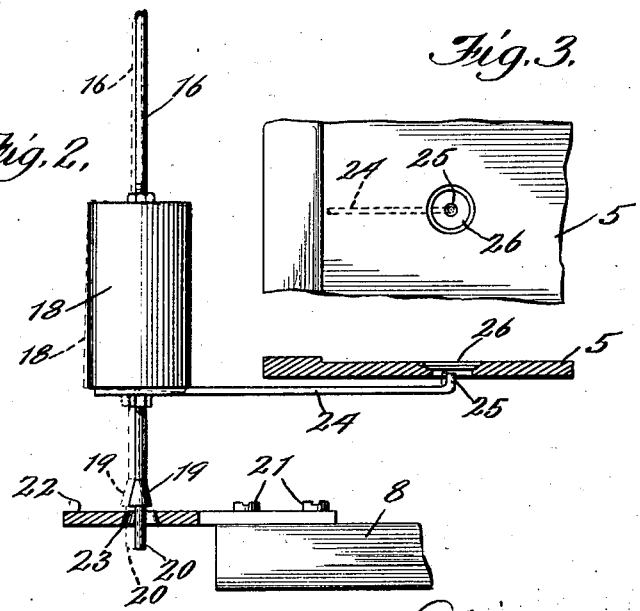

Fig. 1 is a sectional elevation of a weighing apparatus illustrating the application of my invention;

Fig. 2 is a detail view in elevation and partly in section of the main operating parts of an embodiment of my invention; and Fig. 3 is a top plan view of the level indicator.

Referring now to the drawing in detail, the weighing apparatus which I have selected for illustrating the salient features of my invention is of a type which may be used for store counters and comprises a base housing 5 having a base plate 6 with an upright column 7 supported upon the housing 5 for containing the dials of the weighing indicating mechanism. The weighing mechanism with which my invention is associated may comprise a weigh beam 8 which is fulcrumed on the bracket 9 and carries at one end a load platform 10 and is connected at its opposite end in the usual way to a pendulum resistant 11 through the medium of a connecting rod 12 with pointers 13 connected to the pendulum resistant 11 positioned to move across the fixed weight indicating dials 14, the same being exposed through the glass panes 15.

In the prefered embodiment of my invention, I equip the weighing apparatus with a pendulous member 16, the same being suspended from the side of the column 7 by a pin 17. The member 16 may comprise a rod and a suspension therefor so constructed that the rod always hangs plumb. This rod is provided adjacent its lower end with a weight 18 which assists it in keeping its vertical position and it is further provided with an enlarged part 19 beneath the weight. The enlarged part 19 is disposed near to but spaced away from the extremity 20 of the rod. Secured on top of the weigh beam 8 by bolts, screws or the like 21, is a strip, plate or the like 22 having an opening 23 for the reception of the end 20 of the rod 16. The opening 23 is just large enough to allow the enlarged part 19 of the rod to pass therethrough. The extremity 20 of the rod normally projects into this opening, as clearly shown in Fig. 2.

Now, if the apparatus is placed in an accurate weighing horizontal position, the rod will hang in direct alinement with the opening 23 so that the weigh beam, when it functions, will move freely. When, however, the apparatus is unlevel or even slightly varied from an accurate weighing horizontal position, the rod will swing to one side of the position shown in full lines in Fig. 2 and may occupy, for instance, a position shown in dotted lines in this figure in which the rod is out of direct alinement with the opening and when in such position, the enlarged part 19 will foul the plate or strip 22 and thereby arrest the function of the weighing mechanism.

It will be understood that the movement of the rod 16 is only a movement relative to the other parts of the weighing apparatus and that actually this rod does not move except in response to gravity but always hangs in the same vertical position and the other parts of the scale are moved. In order to indicate an accurately weighing horizontal position for the weighing apparatus, I propose to equip the same with a level indicator and connect the indicator in operation with the pendulous member. To this end, I employ a rod 24 which is connected at one end to the rod 16 below the weight 18 with its opposite end projecting under the top of the housing 5 and terminating in an upwardly presented pointer 25 disposed below a sight gauge or the like 26 made as an inset in the top of the housing. When the pointer 25 is centered with respect to the sight 26, correct accurate horizontal weighing position of the apparatus will be indicated.

In order to adjust the horizontal position of the apparatus to a correct level, the base plate 6 is provided with turn screws or the like 27.

When the apparatus is set upon a counter or other supporting surface and the level indicator shows that it is not level, the turn screws 27 may be selectively used until the indicator shows that the apparatus is level. When this is accomplished, the rod 16 is in direct alinement with the opening 23 so that the weigh beam has an unobstructed free movement so far as concerns the pendulous member and the apparatus will continue to correctly function until its level position is disturbed.

The enlarged part 19 on the rod 16 is not altogether essential and can be dispensed with but in this case, the rod must be made shorter so that it does not normally extend through the opening 23 in the plate 22 and the opening in such event, should be made smaller.

It will be understood that although I have described the preferred embodiment of the invention in combination with a conventional type of automatic scale, it is also applicable to other forms of weighing apparatus and also that the embodiment may be modified in many ways without departing from the spirit of the invention as defined by the sub-joined claims.

I claim:—

1. In a weighing apparatus, a weigh beam, and means for arresting the weighing movement of the beam when the apparatus is slightly varied from an accurately weighing horizontal position comprising a pendulous member suspended to hang out of arresting engagement with the beam when the apparatus is in an accurately weighing horizontal position but movable into arresting relation with the beam when the accurately weighing position of the apparatus is varied comprising a pendulous member suspended over the beam having a relative horizontal movement, and means on the beam to cooperate with said member when the member is moved relatively thereof.

2. A weighing apparatus having means associated with the weighing mechanism thereof for rendering the same inactive when the apparatus is slightly varied from an accurately weighing horizontal position, and a level indicating means on the apparatus actuated by said means.

3. A weighing apparatus having a pendulous member associated with the weighing mechanism thereof for arresting the function of said mechanism when the apparatus is slightly varied from an accurately weighing horizontal position, and level indicating means on the apparatus actuated by said pendulous member.

4. In a weighing apparatus, a weigh beam, and means for arresting the weighing movement of the beam when the apparatus is slightly varied from an accurately weighing horizontal position comprising a pendulous member suspended to hang out of arresting engagement with the beam when the apparatus is in an accurately weighing horizontal position but movable into arresting relation with the beam when the accurately weighing position of the apparatus is varied, a level indicator on the apparatus, and an actuating connection between said indicator and said pendulous member.

5. In a weighing apparatus, a weigh beam, and means for arresting the weighing movement of the beam when the apparatus is slightly varied from an accurately weighing horizontal position comprising a pendulous member, and means on the beam to co-operate with said member comprising a plate-like member having an opening therein for the reception of the end of the pendulous member, the end of the pendulous member being substantially centered with respect to said opening when the apparatus is in an accurately weighing horizontal position but adapted to move into engagement with the plate when said position of the apparatus is varied, a level indicator on the apparatus, and an actuating connection between the pendulous member and the indicator comprising an arm connected to the pendulous member above the weigh beam, a sight gauge on the weighing apparatus, and a pointer exposed through said sight gauge and actuated by said arm.

6. In a weighing apparatus, the combination of a level indicator and means for actuating said indicator, and arresting the weighing mechanism of the apparatus when the apparatus is slightly varied from an accurately weighing horizontal position.

7. In a weighing apparatus, the combination of a level indicator and means for actuating said indicator, and arresting the weighing mechanism of the apparatus when the apparatus is slightly varied from an accurately weighing horizontal position comprising a pendulous member suspended with its free end in position to engage and arrest the weighing mechanism when the member is moved in response to an unlevel position of the apparatus, and a connection between said member and the level indicator.

8. In a weighing apparatus, a weigh beam, and means for arresting the weighing movement of the beam when the apparatus is slightly varied from an accurately weighing horizontal position comprising a pendulous member having a weight at its lower end, said member being suspended at its upper end above said beam with said weight positioned above said beam, the lower end of said pendulum and weigh beam having an interfitting projection and recess connection for arresting movement between said beam and pendulous member when the accurately weighing position of the apparatus is varied.

9. In a weighing apparatus, a weigh beam, and means for arresting the weighing movement of the beam when the apparatus is slightly varied from an accurately weighing horizontal position comprising a pendulous member having a weight at its lower end, said member being suspended at its upper end above said beam with said weight positioned above said beam, said beam carrying a part having a recess therein, a projection on the lower end of said pendulous member extending into said recess for arresting movement between said beam and pendulous member when the accurately weighing position of the apparatus is varied.

In testimony whereof I have signed my name to this specification on this 20th day of August A. D. 1927.

ADRIANUS van DUYN.